(12) United States Patent
Hsieh

(10) Patent No.: US 10,817,215 B2
(45) Date of Patent: Oct. 27, 2020

(54) DATA STORAGE SYSTEM AND CONTROL METHOD FOR NON-VOLATILE MEMORY

(71) Applicant: Silicon Motion, Inc., Jhubei, Hsinchu County (TW)

(72) Inventor: Sung-Yen Hsieh, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 69 days.

(21) Appl. No.: 16/413,942

(22) Filed: May 16, 2019

(65) Prior Publication Data

US 2019/0384527 A1 Dec. 19, 2019

(30) Foreign Application Priority Data

Jun. 13, 2018 (TW) .............................. 107120354 A

(51) Int. Cl.
*G06F 12/00* (2006.01)
*G06F 3/06* (2006.01)
*G06F 1/28* (2006.01)

(52) U.S. Cl.
CPC .............. *G06F 3/0658* (2013.01); *G06F 1/28* (2013.01); *G06F 3/064* (2013.01); *G06F 3/0679* (2013.01)

(58) Field of Classification Search
CPC ......... G06F 12/0804; G06F 2212/1032; G06F 2212/608; G06F 3/0656; G06F 13/1673
See application file for complete search history.

(56) References Cited

U.S. PATENT DOCUMENTS

| 7,111,194 B1* | 9/2006 | Schoenthal ......... G06F 11/2069 |
| | | 707/999.202 |
| 7,275,140 B2 | 9/2007 | Paley |
| 8,266,365 B2 | 9/2012 | Lasser |
| 8,452,929 B2 | 5/2013 | Bennett |
| 8,930,671 B2 | 1/2015 | Asnaashari et al. |
| 9,003,144 B1* | 4/2015 | Hayes .................. G06F 3/0683 |
| | | 711/162 |
| 9,329,992 B2 | 5/2016 | Wu et al. |
| 2013/0185479 A1* | 7/2013 | Lin ........................ G06F 12/145 |
| | | 711/103 |
| 2013/0275655 A1 | 10/2013 | Chang |
| 2013/0290609 A1* | 10/2013 | Lee ...................... G06F 12/0246 |
| | | 711/103 |

(Continued)

FOREIGN PATENT DOCUMENTS

| CN | 104205229 A | 12/2014 |
| CN | 104699621 A | 6/2015 |

(Continued)

*Primary Examiner* — John A Lane
(74) *Attorney, Agent, or Firm* — McClure, Qualey & Rodack, LLP

(57) ABSTRACT

A data structure for storing specific information of a non-volatile memory is disclosed. To store a file, the non-volatile memory is allocated to provide a first block and a second block to store file content and file system data separately. A root table is maintained on the non-volatile memory, wherein the root table contains usage information of the first block and the second block. When updating the root table to update the usage information of the first block and the second block, the usage information of the first block and the second block is also updated to the second block as metadata. The power restoration procedure is greatly simplified.

16 Claims, 6 Drawing Sheets

(56) References Cited

U.S. PATENT DOCUMENTS

2020/0019322 A1* 1/2020 Qiang ................. G06F 3/0634
2020/0285664 A1* 9/2020 Maybee ................ G06F 3/065

FOREIGN PATENT DOCUMENTS

| TW | 201027334 A | 7/2010 |
| TW | 201040720 A | 11/2010 |
| TW | 201344432 A | 11/2013 |
| WO | 2013/147923 A1 | 10/2013 |

* cited by examiner

DATA STORAGE SYSTEM AND CONTROL METHOD FOR NON-VOLATILE MEMORY

CROSS REFERENCE TO RELATED APPLICATIONS

This application claims priority of Taiwan Patent Application No. 107120354, filed on Jun. 13, 2018, the entirety of which is incorporated by reference herein.

BACKGROUND OF THE INVENTION

Field of the Invention

The present invention relates to data storage devices and control methods for non-volatile memory.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on.

The write operations on the non-volatile memory may be interrupted by an unexpected power-off event. To guarantee the storage reliability, the data storage device requires a power recovery procedure. An efficient power recovery procedure is an important topic in the technical field.

BRIEF SUMMARY OF THE INVENTION

The present invention proposes a data structure to realize an efficient power recovery procedure.

A data storage device in accordance with an exemplary embodiment of the disclosure includes a non-volatile memory and a controller. As requested by a host, the controller writes a file to the non-volatile memory. The controller allocates the non-volatile memory to provide a first block for storage of the file content. The controller allocates the non-volatile memory to provide a second block for storage of the file system data. The controller maintains a root table on the non-volatile memory, wherein the root table contains usage information of the first block and the second block. When updating the root table to update the usage information of the first block and the second block, the controller further updates the usage information of the first block and the second block to the second block as metadata. A power restoration procedure is greatly simplified because the update of metadata is tied to the update of the root table.

In an exemplary embodiment, the controller completely copies the root table to the second block as metadata. Each page comprises N storage units, where N is an integer greater than 1. The root table may be in a size smaller than one storage unit. The controller may allocate one page of the second block to provide one storage unit to store a copy of the root table as metadata, and allocate the other (N−1) storage units of the same page to store the file system data.

In a power recovery procedure of the data storage device, the controller may search the non-volatile memory for the second block according to the root table and, benefiting from the fact that the metadata of the second block is copied from the root table, the controller determines whether the second block is reliable without comparing the metadata of the second block with the root table. The controller continues using the second block when determining that the second block is reliable.

In an exemplary embodiment, information recorded in the root table to be copied to the second block as metadata includes: a first block number indicating the first block; a first page usage status of the first block; a second block number indicating the second block; a second page usage status of the second block; and a third block number indicating a third block that was previously used for storage of the file system data.

In an exemplary embodiment, when determining that the second block is unreliable, the controller searches the non-volatile memory for the third block based on the root table and determines whether to continue using the third block for storage of the file system data.

In an exemplary embodiment, the controller searches the non-volatile memory for the second block in a forward direction to get a first empty page and then searches the non-volatile memory for the second block in the reverse direction to define the last valid page. The controller overwrites unreliable pages with dummy data to continue using the second block for storage of the file system data.

In another exemplary embodiment of the present invention, a control method for a non-volatile memory is disclosed, which is based on the aforementioned concepts.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
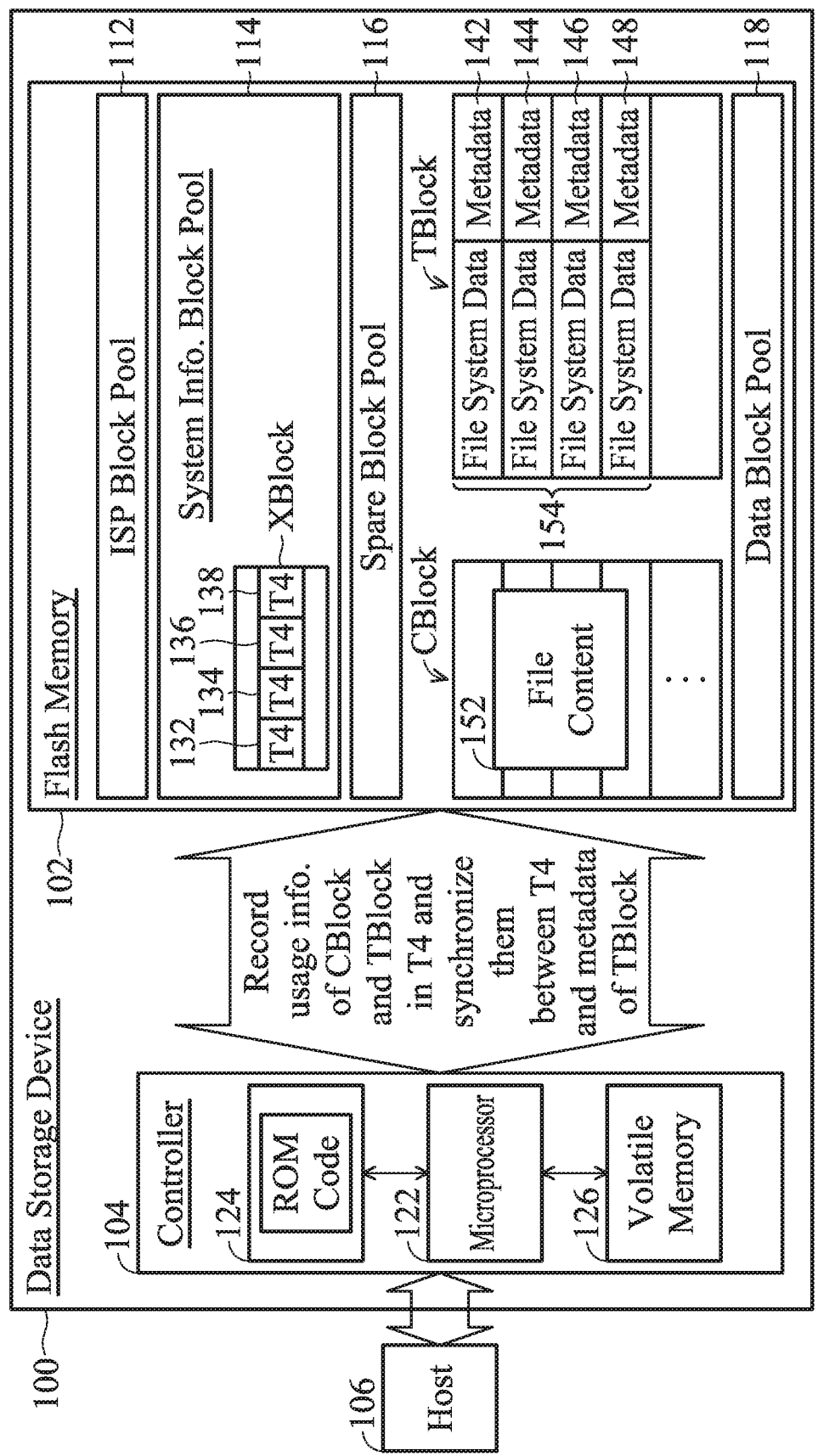
FIG. 1 is a block diagram depicting a data storage device 100 in accordance with an exemplary embodiment of the present invention, which includes a flash memory 102 and a controller 104.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion uses flash memory as an example.

Flash memory is often used as a storage medium in today's data storage devices. Flash memory is often implemented in memory cards, USB flash devices, SSDs, and so on. In another exemplary embodiment, a flash memory may be packaged with a controller to form a multiple-chip package named eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

The host distinguishes data according to logical addresses (e.g., logical block addresses LBAs or global host page numbers GHPs . . . etc.). The physical space of flash memory is divided into a plurality of blocks. Each block includes a plurality of pages. Each page includes N storage units, and N is an integer greater than one, such as 4. One page of 16 KB may be divided into four storage units and each storage unit is 4 KB. In an exemplary embodiment, a block is allocated from low to high page number for data storage. As the data is stored, the logical addresses corresponding to each page (or even each storage unit) must be recorded in a mapping table. Many operations of flash memory are based on this mapping table. In particular, the storage space of the flash memory needs to be erased in units of blocks before being allocated again. The updated data are not overwritten on the same space. After the new version of data is written to the spare space, the content in the old space is marked as invalid. A block may retain just a few valid data. Thus, garbage collection is required. The sporadic valid data retained in one block is collected to a spare space by garbage collection. The block with only invalid data remained can be erased and then reused.

A flash memory may be allocated to store different types of data in separate blocks. When a host requests to store a file, the file content and the file system data are written in separate blocks. For example, for storage of an audio file, such as an mp3 file, the block (hereinafter referred to as CBlock) storing the audio data (i.e. the file content) is different from the block (hereinafter referred to as TBlock) storing the file system data (including the file type (e.g. mp3), the file name, the size, the sound quality, the sampling rate, and so on). Compared to the file content, the file system data is smaller in size. The file system data may be frequently updated and so that the block TBlock dedicated to store file system data may usually remain only a small amount of valid data. When performing garbage collection on the block TBlock, storage space is efficiently released.

To cope with an unexpected power-off event, a power recovery procedure is proposed to determine whether to continue using the block TBlock for storage of the file system data. In the present invention, the way to fill the block TBlock is specially designed, which significantly accelerates the power recovery procedure.

FIG. 1 is a block diagram depicting a data storage device 100 in accordance with an exemplary embodiment of the present invention, which includes a flash memory 102 and a controller 104. The controller 104 operates the flash memory 102 in response to the requests from the host 106.

After allocation, the storage space of the flash memory 102 may be separated for storage of different data types.

An in-system program (ISP) block pool 112 stores ISPs. A system information block pool 114 stores system information, wherein a block XBlock is configured to store a root table T4. The root table T4 stores the information required in the power recovery procedure. When operating the flash memory 102, the controller 104 dynamically updates the root table T4 to prepare the information required in the possible power recovery procedure. When one page is 16 KB, the root table T4 may not exceed 4 KB (smaller than one storage unit). As shown, there are four versions of root table T4, which are labeled as 132, 134, 136, and 138. The reference numeral 138 is the root directory T4 of the latest version. Blocks CBlock and TBlock are selected from the spare block pool 116 for storage of a file. The file content is written to block CBlock, and the file system data is written to block TBlock. Each page of block TBlock further provides a space for storage of metadata, which includes the usage information of the blocks CBlock and TBlock. The controller 104 dynamically updates the usage information of the blocks CBlock and TBlock in the root table T4. The update on the root table T4 due to the dynamic update of the usage information of the blocks CBlock and TBlock is tracked by the metadata of block TBlock. As indicated by the reference numerals 132, 134, 136, and 138, the root table T4 is updated several times with the update of the usage information of the blocks CBlock and TBlock. Different versions of metadata, therefore, are recorded in the block TBlock and are indicated by the reference numerals 142, 144, 146 and 148. In an exemplary embodiment, the root table T4 is directly copied to the block TBlock as metadata. The metadata indicated by the reference numeral 142 is a copy of the root table T4 indicated by the reference numeral 132. The metadata indicated by the reference numeral 144 is a copy of the root table T4 indicated by the reference numeral 134. The metadata indicated by the reference numeral 146 is a copy of the root table T4 indicated by the reference numeral 136. The metadata indicated by the reference numeral 148 is a copy of the root table T4 indicated by the reference numeral 138. Corresponding to the metadata updates indicated by reference numerals 142, 144, 146 and 148, the file system data is repeatedly duplicated. When the root table T4 does not exceed 4 KB, each page of the block TBlock can provide a space of 4 KB to store the copy of the root table T4 as metadata. Thus, 12 KB is left in each page for storage of the file system data. After completing data writing, the blocks CBlock and TBlock may be pushed into the data block pool 118. The spare block pool 116 supplies new blocks CBlock and TBlock for the storage of another file.

When the usage information of the blocks CBlock and TBlock is updated, the root table T4 is updated which triggers the writing (of the file system data and metadata) on a new page of the block TBlock. On the block TBlock, the update of the metadata immediately follows the update of the root table T4. Thus, it is not easy for an unexpected power-off event to break the data consistency between the root table T4 and the metadata on the block TBlock. A power recovery procedure starts according to the information contained in the root table T4 recorded on the block XBlock. When deciding whether to continue using the block TBlock, there is no need to check whether the metadata in the block TBlock matches the root table T4. The firmware of the power recovery procedure is greatly simplified and the execution time of the power recovery procedure is reduced.

As shown, the file content 152 stored in block CBlock corresponds to the information (indicated by 154) stored in block TBlock. The reference numeral 154 indicates several pages storing the same file system data. Thus, the file system data is strong and not easily corrupted by an unexpected power-off event. The file content 152 can be successfully read out according to the file system data obtained from the block TBlock although an unexpected power-off event occurred.

FIG. 1 also schematically illustrates the architecture of the controller 104. The controller 104 includes a microprocessor 122, a read only memory 124, and a volatile memory 126. The read only memory 124 and the volatile memory 126 may be integrated with the microprocessor 122 or externally connected to the microprocessor 122. The read only memory 124 carries read-only code. The microprocessor 122 may operate the flash memory 102 according to the read-only code contained in the read-only memory 124 and the ISPs carried in the ISP block pool 112. When operating the flash memory 102, the microprocessor 122 may utilize the volatile memory 126 for temporary storage of information required for the operations of the flash memory 102. The controller 104 architecture may have other variations.

The controller 104 dynamically maintains the usage information of the block CBlock and the block TBlock in the root table T4. As the root table T4 is updated, the controller 104 further copies the updated root table T4 into the block TBlock as metadata. After an unexpected power-off event, a power recovery procedure starts according to the root table T4 recorded in the block XBlock. When determining whether to continue using the block TBlock during the power recovery procedure, there is no need to check whether the metadata on the block TBlock matches the root table T4. The power recovery procedure is greatly simplified.

Figure 2:
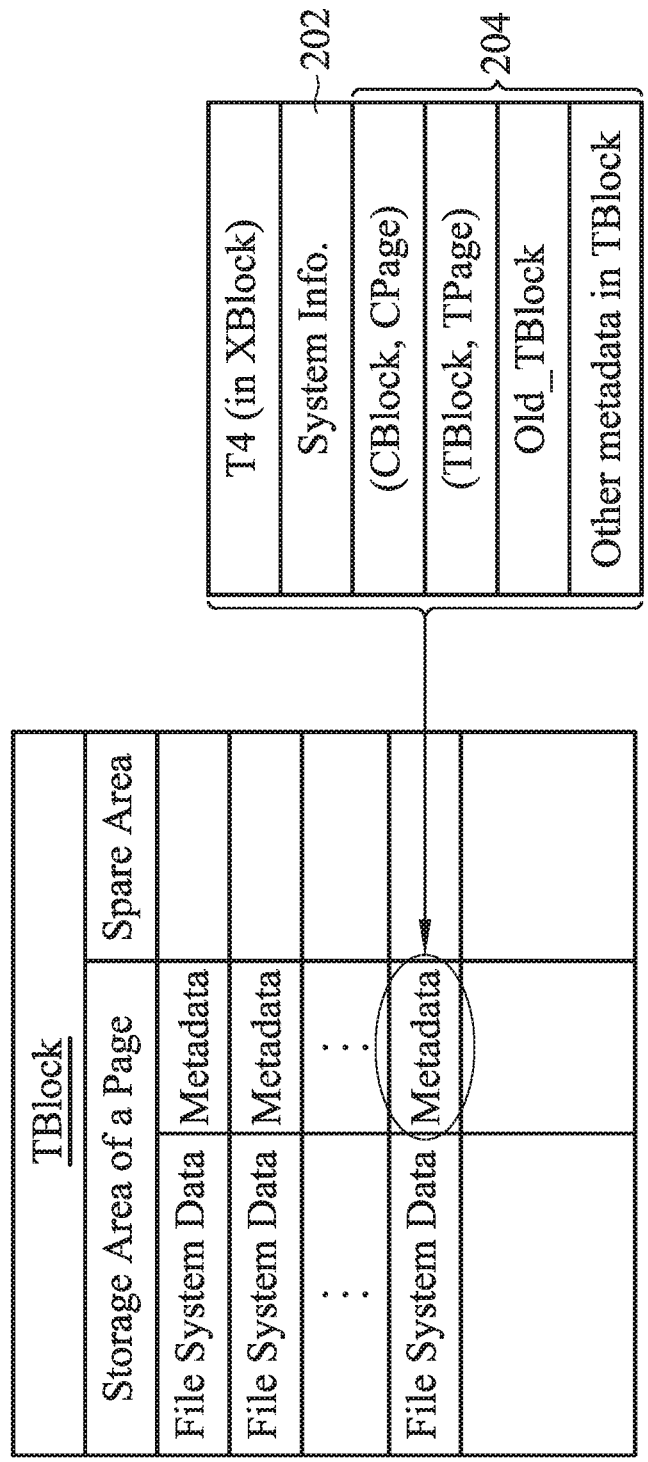
FIG. 2 details the data structure of the root table T4 in accordance with an exemplary embodiment of the present invention and, as shown, the root table T4 is copied to the block TBlock as metadata.

FIG. 2 details the data structure of the root table T4 in accordance with an exemplary embodiment of the present invention. As shown, the root table T4 is copied to the block TBlock as metadata. In addition to the system information 202 (e.g., a pointer indicating a mapping table) that needs to be dynamically managed in the root table T4, the root table T4 further records usage information 204 of the blocks CBlock and TBlock, including (CBlock, CPage), (TBlock, TPage), Old_TBlock, and other metadata about the block TBlock. (CBlock, CPage) indicate the block CBlock (e.g., recording the block number of the block CBlock) and the page usage status CPage of the block CBlock (e.g., recording the page number of the last used page). (TBlock, TPage) indicate the block TBlock (e.g., recording the block number of the block TBlock) and the page usage status TPage of the block TBlock (e.g., recording the page number of the last used page). Old_TBlock indicates what the previous (old) block allocated to store file system data is. Every time the usage information of the blocks CBlock and TBlock changes, the root table T4 is updated on the block XBlock and the update is also reflected in the metadata of the block TBlock. The root table T4 recorded in the block XBlock may be completely copied to the block TBlock as metadata (including information 202 and 204), or only the information 204 is copied to the block TBlock as metadata.

In a conventional technology, the metadata of block TBlock is not copied from the root table T4 maintained on the block XBlock. The root table T4 maintained on the block XBlock may only include just a part of information that has to be also recorded in the metadata of block TBlock. In the conventional technology, the file system data is written into a page of block TBlock with metadata when the entire file content has been written to the block CBlock. When the writing of block TBlock is interrupted by an unexpected power-off event, the file system data may be damaged and not matching the file content in block CBlock. Therefore, in the conventional technology, the power recovery procedure wastes a lot computing resources in comparing the metadata of the block TBlock with the corresponding information in the root table T4. Based on the comparing result, it is determined whether the metadata of the block TBlock is correct and whether to continue using the block TBlock. In contrast, the checking step may be eliminated in the present invention because the root table T4 maintained on the block XBlock is synchronously updated to the block TBlock as metadata. In the present invention, the usage information 204 of the blocks CBlock and TBlock is completely recorded in the root table T4. The root table T4, therefore, can be directly copied to the block TBlock as metadata. In some exemplary embodiments, the usage information 204 of blocks CBlock and XBlock is the only information copied from the root table T4 to the block TBlock as metadata.

Figure 3:
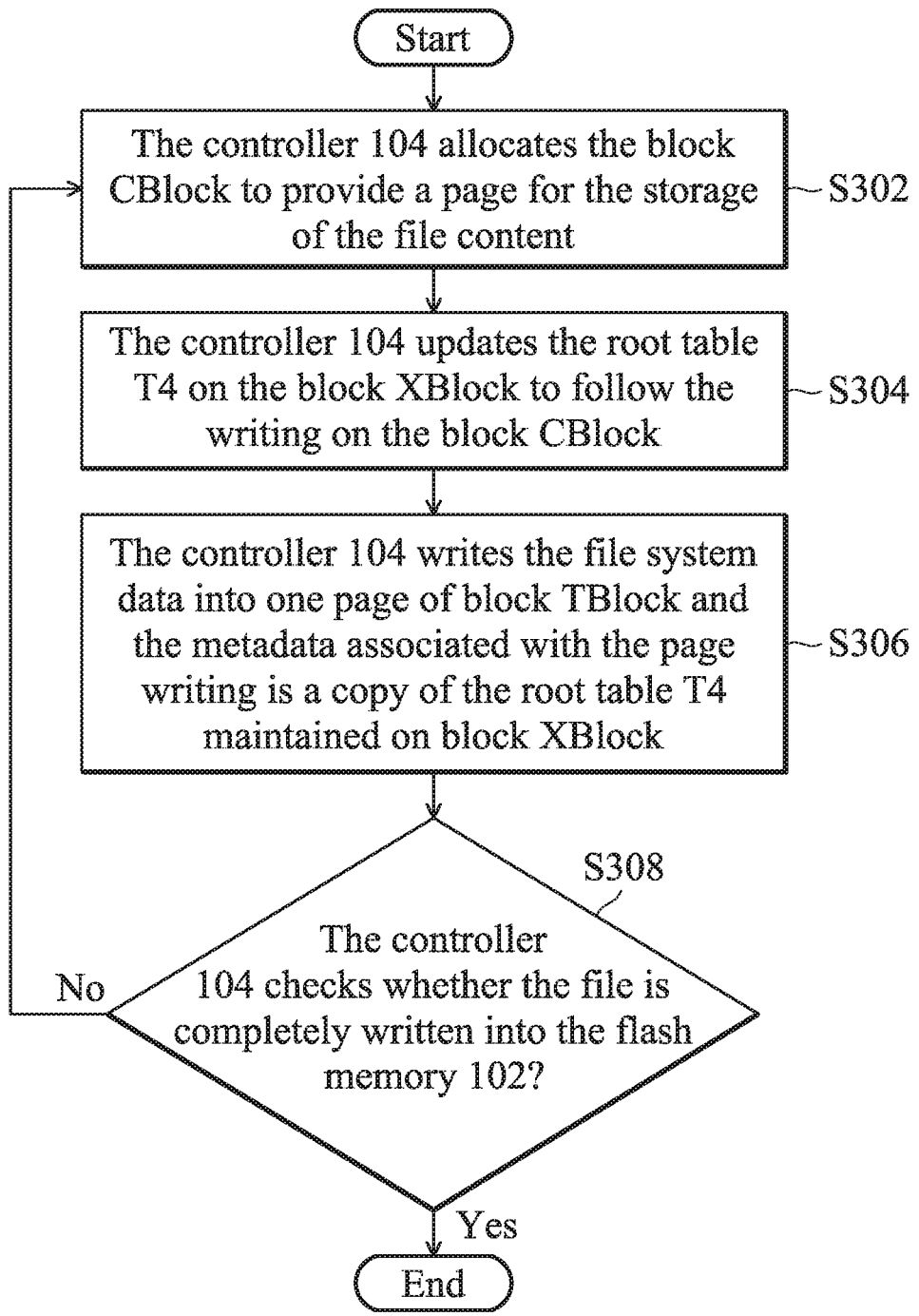
FIG. 3 is a flowchart illustrating how the controller 104 writes a file to the flash memory 102 in accordance with an exemplary embodiment of the present invention.

FIG. 3 is a flowchart illustrating how the controller 104 writes a file to the flash memory 102 in accordance with an exemplary embodiment of the present invention. In step S302, the controller 104 allocates the block CBlock to provide a page for the storage of the file content. In step S304, the controller 104 updates the root table T4 on the block XBlock to follow the writing on the block CBlock. For example, the usage information 204 of the blocks CBlock and TBlock is dynamically updated due to the writing step S302 and the root table T4 is updated. In step S306, the controller 104 writes the file system data into one page of block TBlock and the metadata associated with the page writing is a copy of the root table T4 maintained on block XBlock. In step S308, the controller 104 checks whether the file is completely written into the flash memory 102. If the file is not yet completely written into the flash memory 102, the controller 104 continues to write file content into the block CBlock according to step S302, and repeats steps S304 and S306 to instantly update the metadata of the block TBlock.

Figure 4A:
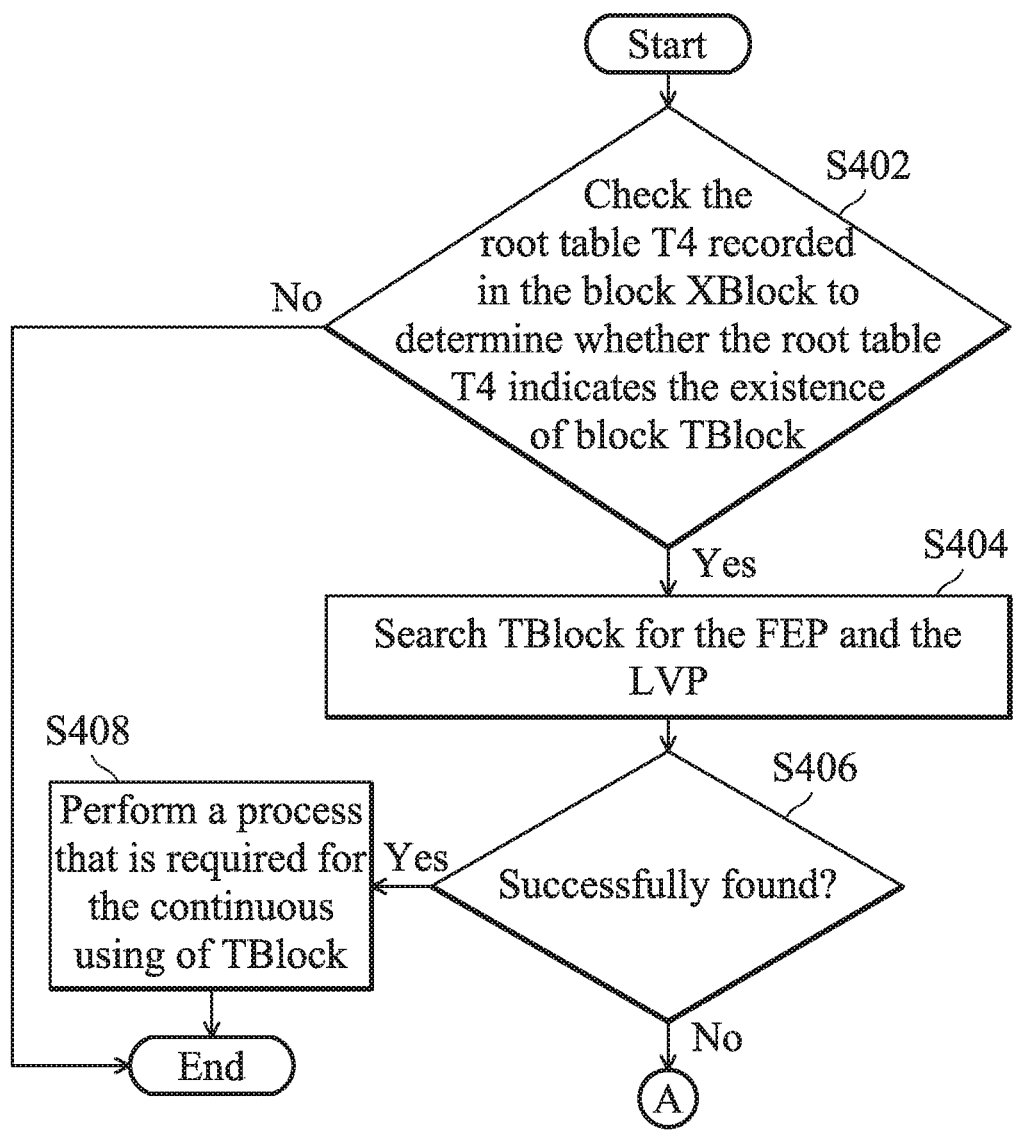
FIG. 4A and FIG. 4B show a flowchart illustrating the way the data storage device 100 determines whether or not to continue using the block TBlock, in accordance with an exemplary embodiment of the disclosure.
Figure 4B:
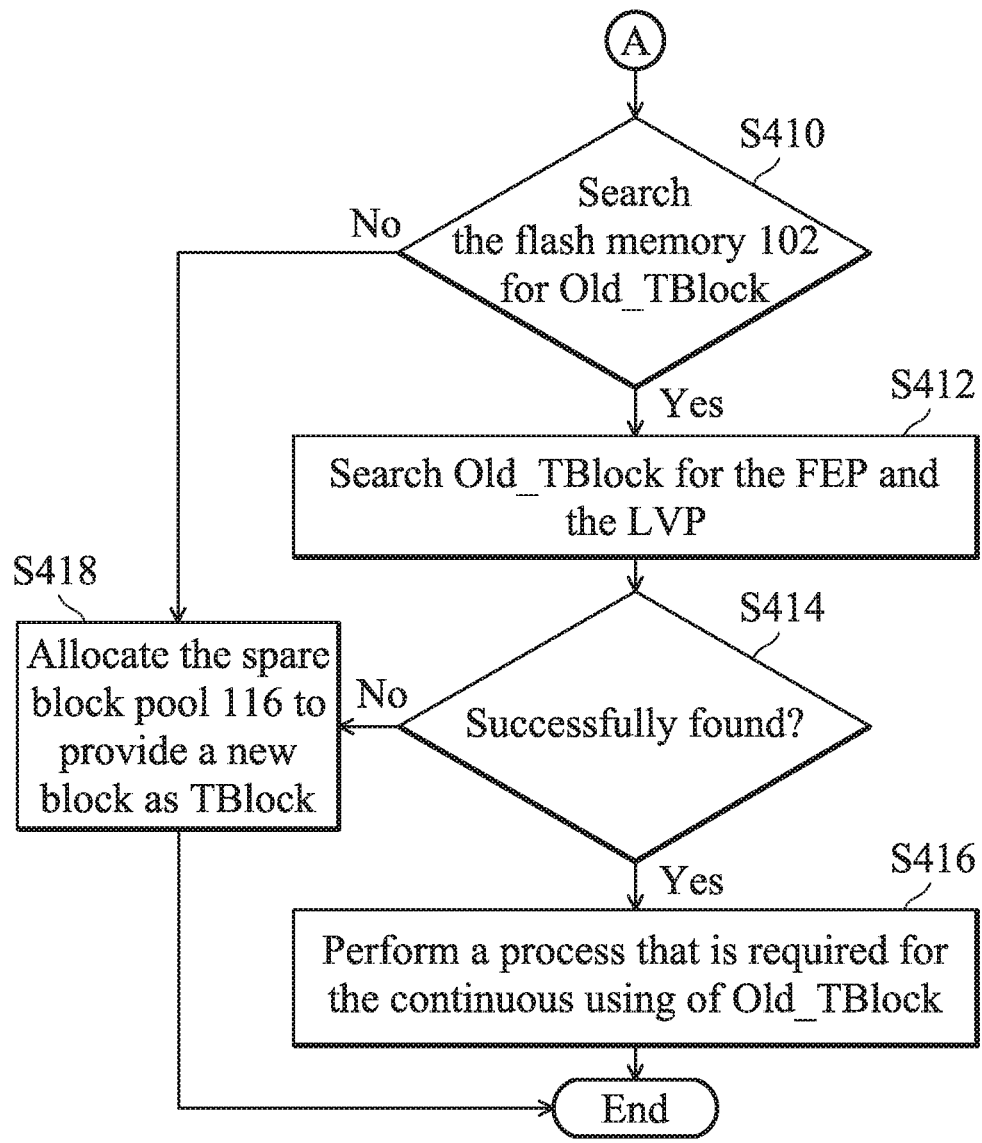

FIG. 4A and FIG. 4B show a flowchart illustrating the way the data storage device 100 determines whether to continue using the block TBlock in accordance with an exemplary embodiment of the disclosure. When being resumed from an unexpected power-off event, step S402 is performed and the controller 104 checks the root table T4 recorded in the block XBlock to determine whether the root table T4 indicates the existence of block TBlock. When block TBlock is found, step S404 is performed and the controller 104 searches block TBlock for the first empty page (referred to as FEP) of the block TBlock and the last valid page (referred to as LVP) in the block TBlock and thereby determines whether the block TBlock has any space for continuous using. When step S406 determines that the FEP and the LVP of block TBlock are found, step S408 is performed for a process that is required for the continuous using of the block TBlock. Then, the controller 104 continues using the block TBlock and the flow ends.

When it is determined in step S406 that the FEP and the LVP of the block TBlock are not found, step S410 is performed. The controller 104 searches the flash memory 102 for the previous file system data receiving block Old_TBlock. The controller 104 may find the block Old_T-Block according to the root table T4 maintained on the block XBlock. When block Old_TBlock is found, step S412 is performed and the controller 104 searches block Old_T-Block for the FEP and the LVP in the block Old_TBlock and thereby determines whether the block Old_TBlock has any space for continuous using. When step S414 determines that the FEP and the LVP of block Old_TBlock are found, step S416 is performed for a process that is required for the continuous using of the block Old_TBlock. Then, the controller 104 continues using the block Old_TBlock for the storage of the file system data.

When it is determined in step S414 that the FEP and the LVP of the block Old_TBlock are not found, step S418 is performed and the controller 104 allocates the spare block pool 116 to provide a new block as TBlock. The controller 104 changes to use the newly-allocated TBlock for the storage of the file system data.

When the controller 104 cannot find the block Old_TBlock in step S410, step S418 is also performed. The controller 104 allocates the spare block pool 116 to provide a new block as TBlock, and changes to use the newly-allocated TBlock for the storage of the file system data.

FIG. 4A and FIG. 4B show that the redundant step of comparing the metadata of block TBlock and the root table T4 of block XBlock that is required in the conventional techniques is omitted.

Figure 5:
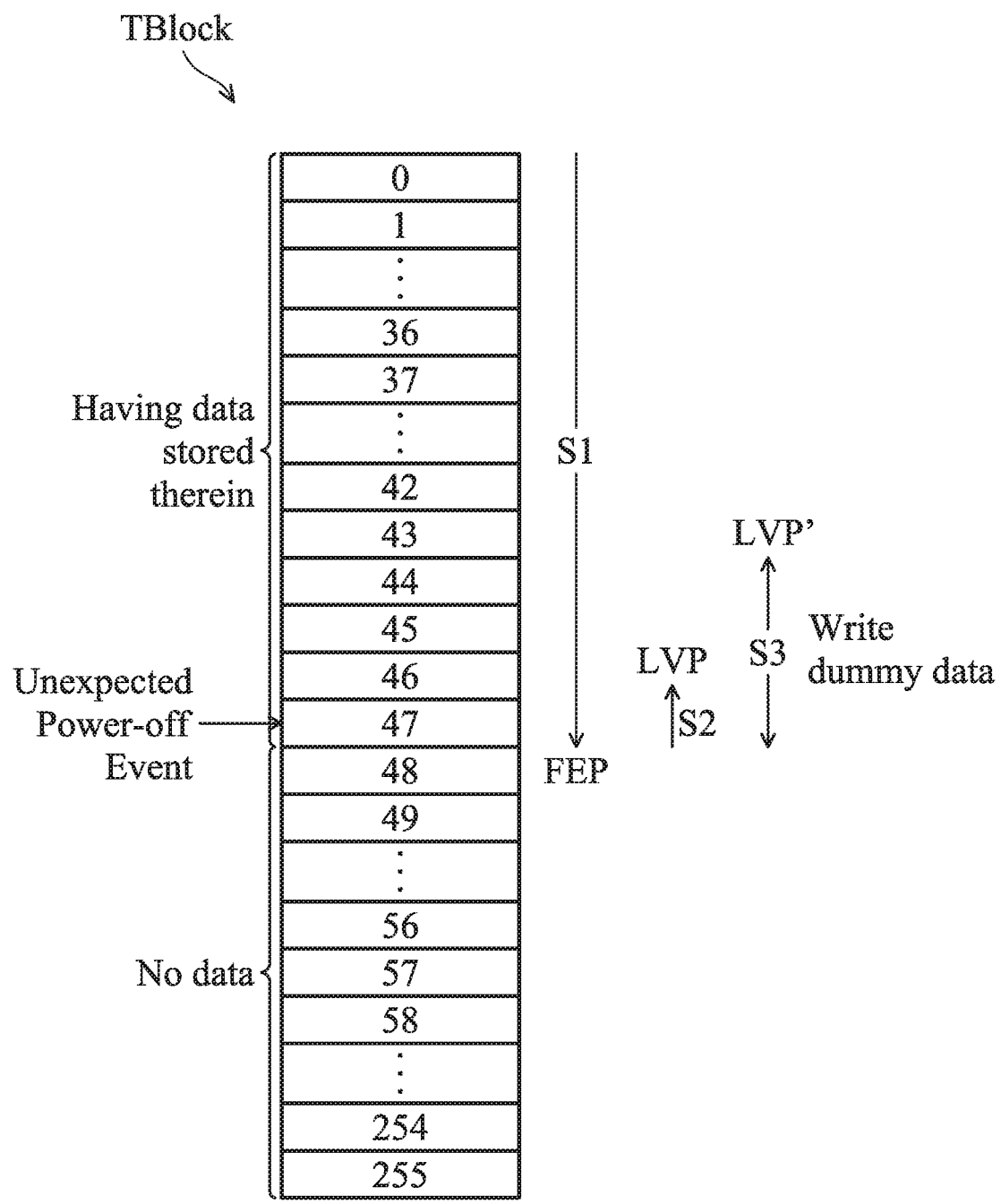
FIG. 5 illustrates the FEP and LVP search of the block TBlock (or Old_TBlock) and the process required to continue using the block TBlock (or Old_TBlock).

FIG. 5 illustrates the FEP and LVP search of block TBlock (or Old_TBlock) and the process required to continue using the block TBlock (or Old_TBlock).

As shown, block TBlock includes 256 pages numbered from 0 to 255. According to a forward search indicated by S1, the first empty page (FEP) of block TBlock is obtained. This forward search may not be performed one page after another. Several pages may be skipped in the empty page checking to speed up the search. According to a reverse search indicated by S2, the last valid page (LVP) of block TBlock is obtained. This reverse search should be performed page-by-page to avoid omissions. As shown, page 46 is determined as the last valid page LVP. This reverse search further observes that page 47 is corrupted due to an unexpected power-off event. As indicated by the reference numeral S3, a process required to continue using the block TBlock is performed. Dummy data is programmed into pages 44 to 47 by a double programming procedure. The last valid page is changed to page 43 and labeled as LVP'. The reliability of the content of block TBlock is guaranteed by the aforementioned steps.

Any techniques in which the root table T4 is in the proposed data structure may be considered as being within the scope of the present invention. The aforementioned determination step performed in the power recovery procedure to determine whether or not to continue using the block TBlock is also within the scope of the present invention. Based on the aforementioned techniques, the present invention further can be used to implement control methods for non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage system, comprising:
a non-volatile memory; and
a controller, writing a file to the non-volatile memory in response to a request from a host,
wherein:
the controller allocates the non-volatile memory to provide a first block for storage of file content;
the controller allocates the non-volatile memory to provide a second block for storage of file system data;
the controller maintains a root table on the non-volatile memory, wherein the root table contains usage information of the first block and the second block; and
when updating the root table to update the usage information of the first block and the second block, the controller further updates the usage information of the first block and the second block to the second block as metadata.

2. The data storage device as claimed in claim 1, wherein:
the controller completely copies the root table to the second block as metadata.

3. The data storage device as claimed in claim 2, wherein:
each page comprises N storage units, where N is an integer greater than 1; and
the root table is smaller in size than one storage unit.

4. The data storage device as claimed in claim 3, wherein:
the controller allocates one page of the second block to provide one storage unit to store a copy of the root table as metadata, and allocates the other (N−1) storage units of the same page to store the file system data.

5. The data storage device as claimed in claim 1, wherein:
in a power recovery procedure of the data storage device, the controller searches the non-volatile memory for the second block based on information obtained from the root table and, benefiting from the fact that the metadata of the second block is copied from the root table, the controller determines whether the second block is reliable without comparing the metadata of the second block with the root table;
the controller continues using the second block when determining that the second block is reliable.

6. The data storage device as claimed in claim 5, wherein information recorded in the root table to be copied to the second block as metadata includes:
a first block number indicating the first block;
a first page usage status of the first block;
a second block number indicating the second block;
a second page usage status of the second block; and
a third block number indicating a third block that was previously used for storage of the file system data.

7. The data storage device as claimed in claim 6, wherein:
when determining that the second block is unreliable, the controller searches the flash memory for the third based on information obtained from the root table and determines whether to continue using the third block for storage of the file system data.

8. The data storage device as claimed in claim 5, wherein:
the controller searches the second block in a forward direction to get a first empty page and then searches the second block in a reverse direction to define a last valid page;
the controller overwrites unreliable pages with dummy data to continue using the second block for storage of the file system data.

9. A control method for a non-volatile memory, comprising:
writing a file to the non-volatile memory in response to a request from a host,
allocating the non-volatile memory to provide a first block for storage of the file content;
allocating the non-volatile memory to provide a second block for storage of the file system data;

maintaining a root table on the non-volatile memory, wherein the root table contains usage information of the first block and the second block; and when updating the root table to update the usage information of the first block and the second block, also updating the usage information of the first block and the second block to the second block as metadata.

10. The control method as claimed in claim 9, further comprising:

completely copying the root table to the second block as metadata.

11. The control method as claimed in claim 10, wherein:

each page comprises N storage units, where N is an integer greater than 1; and the root table is smaller in size than one storage unit.

12. The control method as claimed in claim 11, further comprising:

allocating one page of the second block to provide one storage unit to store a copy of the root table as metadata, and allocating the other (N−1) storage units of the same page to store the file system data.

13. The control method as claimed in claim 9, further comprising:

using a power recovery procedure of a data storage device having non-volatile memory to search the non-volatile memory for the second block according to the root table and, benefiting from the fact that the metadata of the second block is copied from the root table, determining whether the second block is reliable without comparing the metadata of the second block with the root table; and continuing to use the second block when determining that the second block is reliable.

14. The control method as claimed in claim 13, wherein information recorded in the root table to be copied to the second block as metadata includes:

a first block number indicating the first block;

a first page usage status of the first block;

a second block number indicating the second block;

a second page usage status of the second block; and a third block number indicating a third block that was previously used for storage of the file system data.

15. The control method as claimed in claim 14, further comprising:

when determining that the second block is unreliable, searching the non-volatile memory for the third block based on the root table and determining whether to continue using the third block for storage of the file system data.

16. The control method as claimed in claim 13, further comprising:

searching the second block in a forward direction to get a first empty page and then searching the second block in the reverse direction to define the last valid page;

overwriting unreliable pages with dummy data to continue using the second block for storage of the file system data.

* * * * *